J. H. DWORK.
VEHICLE WHEEL.
APPLICATION FILED SEPT. 6, 1916.
1,217,724.
Patented Feb. 27, 1917.
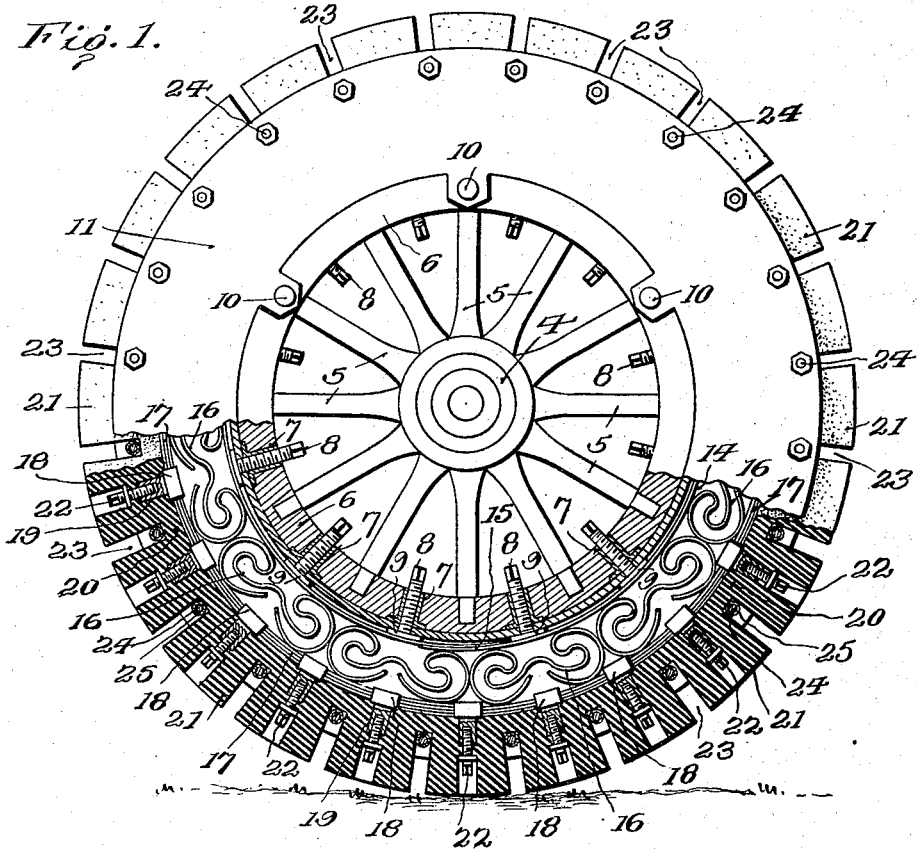
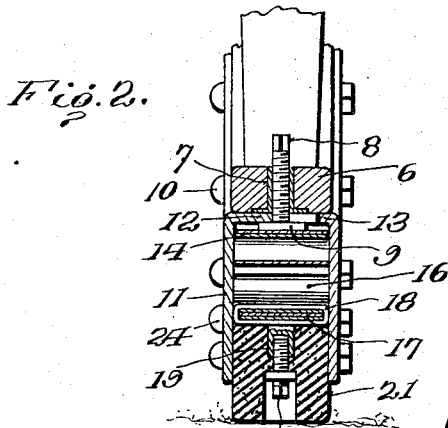
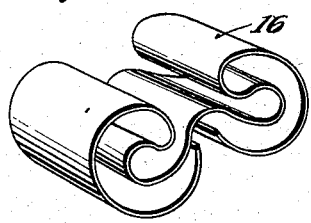
Witness
Inventor
Joseph H. Dwork
By Wm. E. Dyke
Attorney

UNITED STATES PATENT OFFICE.

JOSEPH H. DWORK, OF NEWARK, NEW JERSEY.

VEHICLE-WHEEL.

1,217,724.  Specification of Letters Patent.  Patented Feb. 27, 1917.

Application filed September 6, 1916. Serial No. 118,743.

*To all whom it may concern:*

Be it known that I, JOSEPH H. DWORK, a citizen of the United States, residing at Newark, in the county of Essex and State of New Jersey, have invented certain new and useful Improvements in Vehicle-Wheels; and I do hereby declare the following to be a full, clear, and exact description of the invention, such as will enable others skilled in the art to which it appertains to make and use the same.

My invention relates to vehicle wheels, more especially to resilient spring wheels for use on power-driven trucks, and has for an object the production of wheels of the class indicated, having certain characteristics which render it peculiarly efficient in the performance of its intended functions.

The invention will be hereinafter particularly described, and thereafter pointed out in the appended claims.

In the accompanying drawings which form part of this specification, and whereon corresponding numerals refer to like parts in the several views:

Figure 1 is a side elevation of my invention partly in section, one side plate here being broken away disclosing to view a vertical central section of the structure.

Fig. 2 is a fragmentary view showing a transverse vertical section through the wheel felly and its coöperating resilient elements, and, Fig. 3 a perspective view of one of a series of shock absorbing springs detached.

Reference being had to the drawings and numerals thereon, 4 indicates an ordinary wheel hub, and 5 the usual radial spokes rigidly secured thereto. The spokes 5 are securely mortised into an annular felly 6 which latter differs from ordinary wheel fellies in that it is perforated centrally and radially by a circumferential series of equidistant holes each lined by a steel thimble 7 interiorly screw threaded, and flanged upon its outer end, as clearly shown by Figs. 1 and 2. Within each of said thimbles 7 in screw threaded relation is located a radially adjustable tension screw 8, squared upon its inner end, between spokes 5, for reception of a wrench, and at its outer end provided with a flange or enlarged head 9 for use and purposes that will hereinafter appear.

Securely bolted to opposite sides of the wheel felly 6, as shown at 10, Fig. 1, are annular parallel side plates 11, 11, both having right angular base flanges resting directly upon the periphery of felly 6, and abutting at their edges, although as shown by Fig. 2, one of these flanges 12 is preferably of greater width than the other of said flanges 13, for convenience in assembling the component parts of my invention. The said flange 12 at points directly opposite the openings in thimbles 7 aforesaid, is slotted to permit passage of the tension screws 8 which are thus capable of independent radial adjustment through said thimbles and flange.

Surrounding the flanges 12, 13, and bearing directly upon the heads 9 of tension screws 8, is an inner load-carrying band 14 the ends of which overlap, as shown at 15, to provide for radial expansion. This band 14 is preferably of spring material and of a gage best suited to load limits for which the structure is intended. Surrounding the said band 14 in turn is a circumferential series of individual shock absorbing springs 16, likewise of gage and strength best suited to load limits of the vehicle, and formed substantially as shown by Figs. 1 and 3 of a plurality of reversely arranged convolutes.

These springs 16 preferably abut at opposite ends one against another throughout the entire series as indicated by Fig. 1, and are themselves surrounded and inclosed by an outer load-carrying band 17 also of radially adjustable spring material similar to that of the aforesaid inner band 14, but preferably comprising a plurality of convolutions with loose ends.

Thus it will be observed that the oppositely disposed side plates 11, 11, and the inner and outer load-carrying bands 14 and 17, respectively, constitute a circumferential spring chamber, within which are fitted and confined a continuous series of the shock-absorbing springs 16 adjustable by agency of the radial tension screws 8.

At predetermined regular intervals throughout its entire circumference the said outer spring band 17 is inclosed by metallic loops 18 preferably of rectangular cross sectional form, having outwardly extending interiorly threaded bosses 19 which project through corresponding perforations in the base 20 of an elastic truck tire 21. The said base 20 of the tire 21 rests directly upon the outer surface of the load-carrying spring band 17, and is bound thereto by agency of the aforesaid loops 18, and flanged screws 22, the latter being countersunk into the tread surface of the tire, and threaded into their respective bosses 19, as shown.

The body of tire 21 is radially slotted throughout its circumference in a transverse direction as shown at 23, and within each of these slots is located a transverse bolt 24, surrounded by a tubular spacing sleeve 25, as the means of securing side plates 11, 11, together at these points, without in the least restricting the resiliency of the tire, which is thus left free to reciprocate more or less between the side plates 11, 11 as the load compresses the spring elements of the structure.

Having thus described my invention, what I now claim and desire to secure by Letters Patent is:

1. A vehicle wheel comprising in combination a felly provided with radial outwardly projecting tension screws, a resilient tire having the continuity of its tread surface interrupted by a circumferential series of transverse radial depressions, a circumferential spring chamber between said felly and tire, an expansible inner load-carrying band surrounding said tension screws, an outer expansible load-carrying band, a series of independent shock absorbing springs interposed between said inner and outer bands, inclosing plates upon opposite sides of the structure, and bolts passing loosely through the transverse radial tire depressions aforesaid for connecting the side plates of the structure rigidly together.

2. A vehicle wheel comprising in combination a felly provided with radial outwardly projecting tension screws, a resilient tire having the continuity of its tread surface interrupted by a circumferential series of transverse radial depressions, a circumferential spring chamber between said felly and tire, an expansible inner load-carrying band surrounding said tension screws, an outer expansible load-carrying band, a series of independent shock absorbing springs interposed between said inner and outer bands, duplicate plates of annular form upon opposite sides of the structure constituting the side walls of said spring chamber, bolts passing loosely through the transverse radial tire depressions aforesaid for connecting said side plates rigidly together, and means for securing the tire to said outer load-carrying band at frequent points throughout the base of the tire.

3. A vehicle wheel comprising in combination a felly provided with radial outwardly projecting tension screws, a resilient tire, a circumferential spring chamber between said felly and tire, an expansible inner load-carrying band of spring material surrounding said tension screws within the spring chamber, an outer load-carrying band of convolute form and spring material within said chamber, a circumferential series of independent shock absorbing springs interposed between said inner and outer bands, a series of spaced apart loops each surrounding said outer band, and a corresponding series of screws for securing the tire aforesaid to said loops.

In testimony whereof I affix my signature, in presence of two subscribing witnesses.

JOSEPH H. DWORK.

Witnesses:
 FRANCIS S. MAGUIRE,
 WM. E. DYRE.

Copies of this patent may be obtained for five cents each, by addressing the "Commissioner of Patents, Washington, D. C."